(12) United States Patent
Moreth

(10) Patent No.: US 6,530,611 B2
(45) Date of Patent: Mar. 11, 2003

(54) PIZZA PEEL WITH ROTATABLE BLADE

(75) Inventor: R. Edward Moreth, Ft. Lauderdale, FL (US)

(73) Assignee: Remco Technologies, Inc., Ft. Lauderdale, FL (US)

( * ) Notice: Subject to any disclaimer, the term of this patent is extended or adjusted under 35 U.S.C. 154(b) by 0 days.

(21) Appl. No.: 09/871,930

(22) Filed: Jun. 1, 2001

(65) Prior Publication Data

US 2002/0180226 A1 Dec. 5, 2002

(51) Int. Cl.[7] ................................................ A47J 43/28
(52) U.S. Cl. .............................................. 294/8; 294/32
(58) Field of Search .............................. 294/2, 5, 6, 7, 294/8, 19.1, 25, 32, 49, 53.5, 58; 30/319, 324

(56) References Cited

U.S. PATENT DOCUMENTS

| | | | | |
|---|---|---|---|---|
| 309,437 A | * | 12/1884 | Calef | ........................ 294/58 X |
| 927,823 A | * | 7/1909 | Thompson | ....................... 294/6 |
| 937,520 A | * | 10/1909 | Hacker | ........................... 294/8 |
| 1,237,317 A | * | 8/1917 | Fagerstrom | ..................... 294/8 |
| 1,532,020 A | * | 3/1925 | Angelides | .................. 294/7 X |
| 1,869,299 A | * | 7/1932 | Bracht | ........................... 294/8 |
| 4,758,035 A | * | 7/1988 | Shimasaki | .................. 294/19.1 |
| 5,104,166 A | * | 4/1992 | Corsaro et al. | ........... 294/32 X |
| 5,634,679 A | * | 6/1997 | Hilderbrandt | .................. 294/8 |

* cited by examiner

Primary Examiner—Johnny D. Cherry
(74) Attorney, Agent, or Firm—Frank L. Kubler

(57) ABSTRACT

A pizza peel includes an elongate handle having a handle proximal end and a scooping blade distal end; a pie scooping blade rotatably mounted at the scooping blade distal end; a blade rotation assembly at the scooping blade distal end; and a blade advancement mechanism at the handle proximal end operationally connected to the blade rotation assembly.

10 Claims, 3 Drawing Sheets

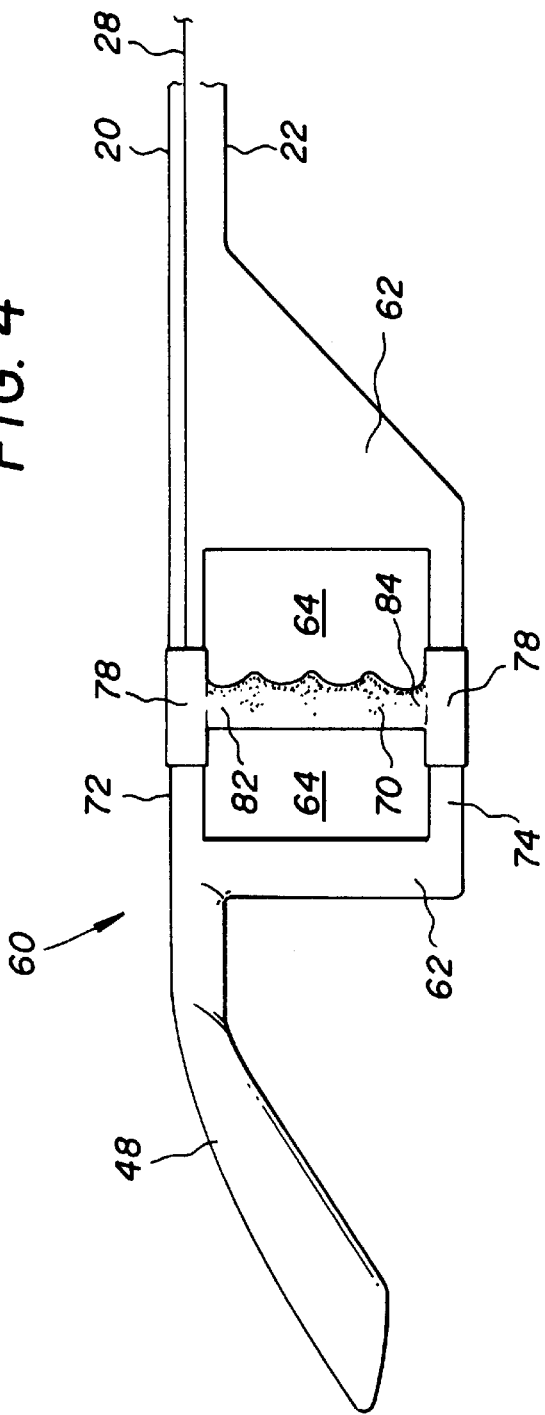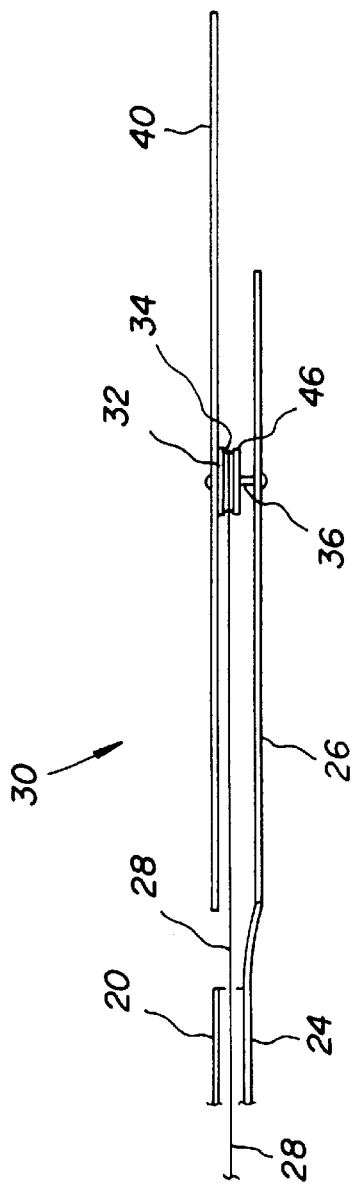

PIZZA PEEL WITH ROTATABLE BLADE

BACKGROUND OF THE INVENTION

1. Field of the Invention

The present invention relates generally to the field of restaurant kitchen equipment. More specifically, the present invention relates to a pizza peel having an elongate handle with a blade rotation grip mechanism at the handle proximal end, a rotatably mounted pie scooping blade on a blade rotation assembly at the scooping blade distal end, and a blade rotation pull cable extending from the blade rotation grip mechanism to the blade rotation assembly. To periodically rotate pizza pies in a deck oven, the pizza chef holds the pizza peel at the handle proximal end and slides the blade underneath a pizza pie resting on a cooking surface. The user lifts the blade and pie, operates the rotation grip mechanism to rotate the blade and pie a preset number of degrees, preferably a quarter turn, then lowers the blade to rest on the cooking surface and slides the blade from underneath the pie, leaving the pie in a new, rotated position.

2. Description of the Prior Art

Pizza pies cooked in deck ovens need to be turned periodically so that the pies cook evenly. There have long been pizza peels for sliding underneath, lifting and repositioning pizza pies in ovens. These pizza peels typically have consisted of a thin metal plate mounted to an end of a handle. Lifting and moving pizza pies around with prior art peels is often a cumbersome task because pizza pies not fully cooked are fragile, and such moving frequently results in substantial damage and loss of product.

It is thus an object of the present invention to provide a pizza peel which includes a handle and a pizza pie support blade rotabably mounted to the handle and remote means for rotating the blade relative to the handle, so that the blade and pizza pie rotate without substantial translational movement.

It is another object of the present invention to provide such a pizza peel which has a profile virtually as low as that of a conventional pizza peel.

It is still another object of the present invention to provide such a pizza peel which is ambidextrous, that is, which is just as easily operated with a user left as with the user right hand.

It is finally an object of the present invention to provide such a pizza peel which is light weight, durable, reliable, simple in design and relatively inexpensive to manufacture.

SUMMARY OF THE INVENTION

The present invention accomplishes the above-stated objectives, as well as others, as may be determined by a fair reading and interpretation of the entire specification.

A pizza peel is provided, including an elongate handle having a handle proximal end and a scooping blade distal end; a pie scooping blade rotatably mounted at the scooping blade distal end; a blade rotation assembly at the scooping blade distal end; and a blade advancement mechanism at the handle proximal end operationally connected to the blade rotation assembly.

The blade advancement mechanism preferably is a blade rotation grip mechanism. The blade rotation grip mechanism preferably is operationally connected to the blade rotation assembly by a blade rotation pull cable having a cable proximal end and a cable distal end. The blade rotation assembly preferably includes a blade mounting flange connected to the scooping blade distal end; a blade axle secured to and protruding from the blade mounting flange, the blade being rotatably mounted on the axle; a cable pulley fitting around the axle and rotatable relative to the axle and affixed to the blade, the cable pulley having a cable receiving circumferential pulley channel; and a rotational return spring having a spring inward end secured to the pulley and having a spring outward end secured to the mounting flange; so that after the blade rotation grip mechanism is operated and causes the pulley and blade to rotate, the rotational return spring rotates the blade back to its original position upon release of the grip mechanism.

The handle proximal end preferably includes a wrist encircling wrist loop structure. The blade rotation grip mechanism preferably includes a grip member for gripping by a user hand, and a grip member guide structure connected to the handle in which the grip member is slidably mounted, the grip member being connected to the cable proximal end.

The blade rotation grip mechanism preferably includes a grip panel including a grip port opening laterally through the grip panel, the grip port having a port upper wall containing a substantially longitudinal upper grip channel and having a port lower wall containing a substantially longitudinal lower grip channel, the grip panel having a thumb grip surface; an upright grip bar within the grip port, having an upper grip bar end extending into the upper grip channel and having a lower grip bar end extending into the lower grip channel, so that the grip bar is slidable forwardly and rearwardly within the grip port in the upper and lower grip channels, the cable proximal end being connected to the grip bar and passing longitudinally along the handle to the blade pulley, the cable distal end being secured within the circumferential pulley channel. The grip bar upper and lower ends preferably each include a perpendicular slide segment which slides within the corresponding the grip channel, so that the grip bar is constrained to remain within the grip channels. The handle preferably is tubular, having a hollow handle interior, and the pull cable passes within the hollow handle interior.

BRIEF DESCRIPTION OF THE DRAWINGS

Various other objects, advantages, and features of the invention will become apparent to those skilled in the art from the following discussion taken in conjunction with the following drawings, in which:

FIG. 4 is a cross-sectional side view of the scooping blade distal end as in FIG. 3.

FIG. 5 is a close-up, broken away side view of the scooping blade distal end, including the mounting flange, blade, pulley, return spring and cable.

DETAILED DESCRIPTION OF THE PREFERRED EMBODIMENTS

Figure 1:
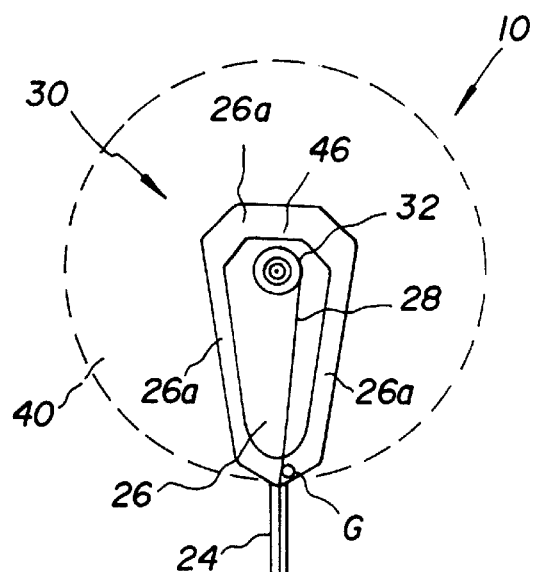
FIG. 1 is a top view of the inventive pizza peel, with the blade shown in broken lines.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
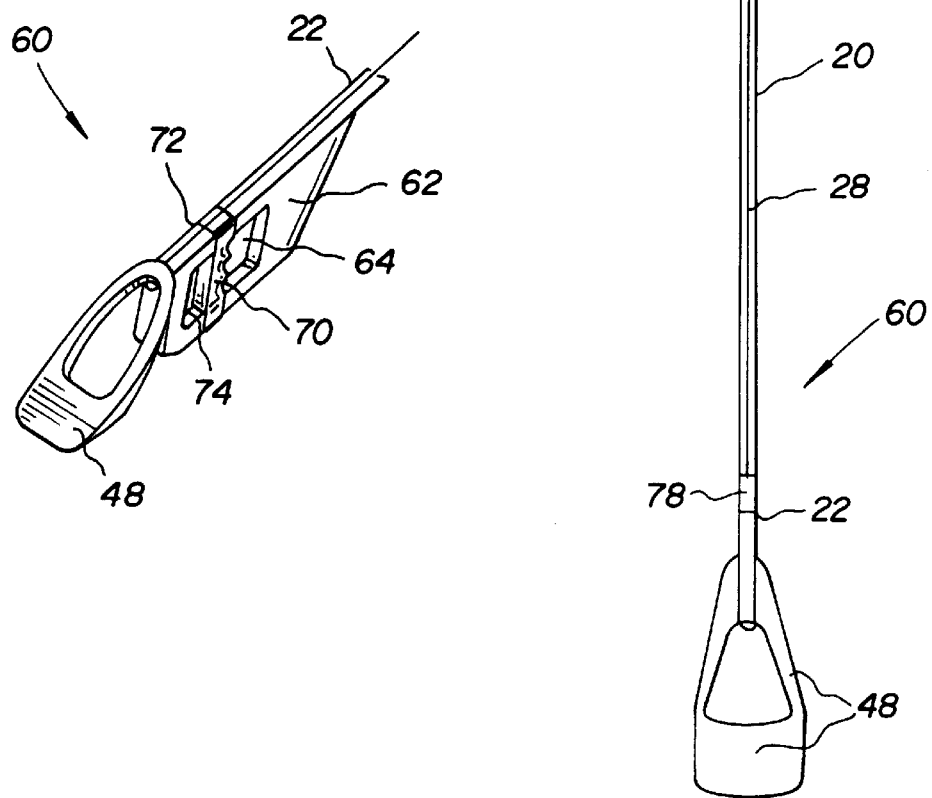
FIG. 3 is a perspective, broken away view of the handle proximal end, including the wrist loop structure, the blade rotation grip mechanism and the pull cable.
Figure 2:
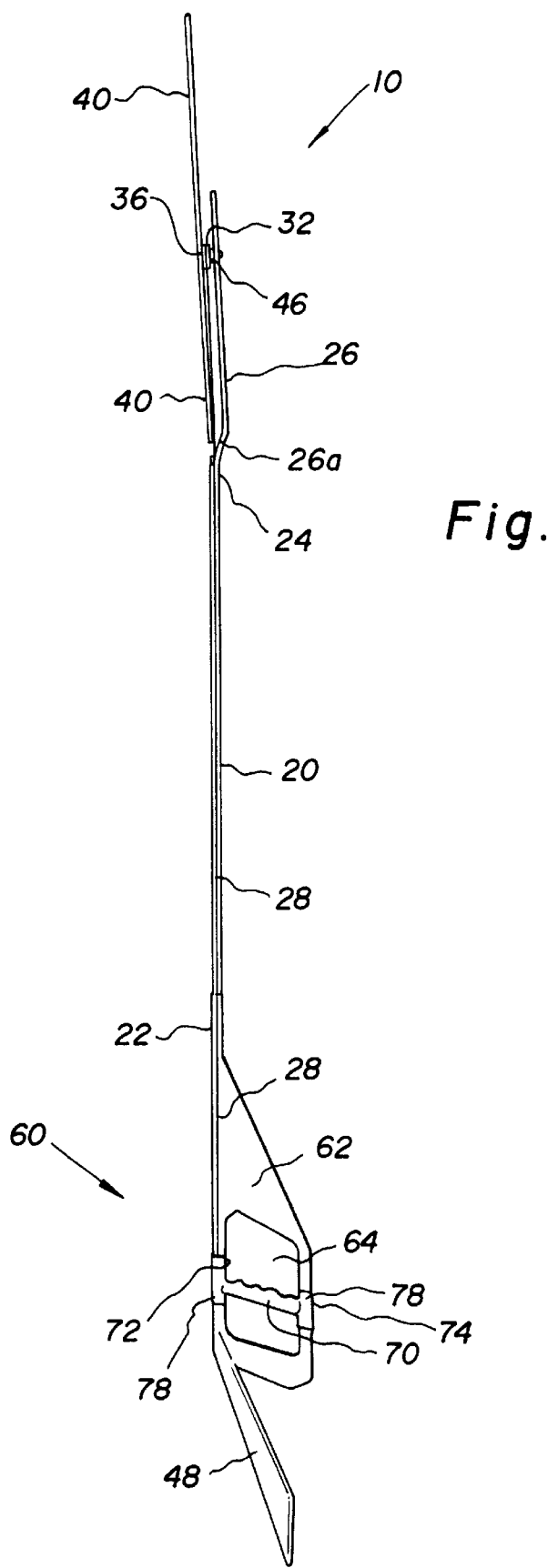
FIG. 2 is a side view of the pizza peel, with the grip panel and handle shown in cross section.

Referring to FIGS. 1–5, a pizza peel 10 is disclosed having an elongate handle 20 with a blade rotation grip mechanism 60 at the handle proximal end 22, a rotatably mounted pie scooping blade 40 on a blade rotation assembly 30 at the scooping blade distal end 24, and a blade rotation pull cable 28 extending from the blade rotation grip mechanism 60 to the blade rotation assembly 30.

Blade rotation assembly 30 includes a blade mounting flange 26 extending from the scooping blade distal end 24. Blade 40 is preferably a thin aluminum or resilient steel disk and is rotatably mounted on a blade axle 36 which is fixedly secured and extends from the mounting flange 26. A cable pulley 32 having a circumferential pulley channel 34 rotatably encircles and is mounted to a face of blade 40, and the distal end of cable 28 is connected to pulley channel 34. The inward end of a flat helical rotational return spring 46 in the configuration of a clock spring is secured to pulley 32 and the outward end of rotational return spring 46 is secured to mounting flange 26.

The handle proximal end 22 terminates in a wrist encircling wrist loop structure 48. Blade rotation grip mechanism 60 is located just distally of loop structure 48, and includes a grip panel 62 which is joined to and protrudes downwardly from handle 20. A grip port 64 opens laterally through grip panel 62, the port 64 having a longitudinal port upper wall containing a longitudinal upper grip channel 72 and having a longitudinal port lower wall containing a longitudinal lower grip channel 74. The rear of grip panel 62 is preferably substantially perpendicular to the longitudinal axis of handle 20 or includes a thumb notch (not shown), to serve as a suitable thumb grip surface 76. An upright grip bar 70 is provided within grip port 64, having an upper grip bar end 82 extending into the upper grip channel 72 and having a lower grip bar end 84 extending into the lower grip channel 74, such that the grip bar 70 is slidable forwardly and rearwardly within the grip port 64 in upper and lower grip channels 72 and 74. The grip bar 70 upper and lower ends preferably each have a perpendicular slide segment 78 which slides within the corresponding grip channel, so that grip bar 70 is constrained to remain within and cannot pivot out of grip channels 72 and 74. See FIG. 4. A proximal end of pull cable 28 is connected to the grip bar 70, preferably at the grip bar 70 lower end, and passes along handle 20 to pulley 32, where the cable 28 distal end is secured within circumferential pulley channel 34. The handle 20 is preferably tubular and the pull cable 28 preferably passes within the hollow interior of handle 20. The grip bar 70 preferably includes finger grip notches 70a.

The mounting flange 26 is preferably dish-shaped to wrap around and shield pulley 32 and rotational return spring 46, the perimeter region 26a of mounting flange 26 being bent toward blade 40. The grip panel 62 is preferably made of injection molded plastic, and the handle 20 including the mounting flange 26 is preferably made of aluminum. Cable 28 is preferably similar in gauge and characteristics to a bicycle brake cable. A plastic cable guide grommet G is preferably provided at scooping blade distal end 24.

When using this embodiment, grip bar 70 is pulled to longitudinally displace cable 28, rotate pulley 32 and thereby rotate blade 40, then grip bar 70 is held its retracted position while the pie is slid off blade 40 and deposited onto the cooking surface, and then the grip bar 70 is released so that rotational return spring 46 rotates blade 40 back to its original position.

The grip port 64 and grip bar 70 are equally accessible and operable by either the left or right user hand, so that the apparatus is ambidextrous. Wrist loop structure 48 bears against the lower surface of the user wrist while blade 40 is lifted to help support handle 20 in a generally horizontal position during use.

Alternatively, a rotational ratchet (not shown) can be mounted to the axle 36, or to blade 40, and a grip bar linear return spring (not shown) is provided in the grip panel 62, so that pulling pull cable 28 rotates the blade 40 the certain number of degrees and the blade 40 remains in the new rotational position until further rotated the same number of degrees in the same rotational direction with another pull of the grip bar 70.

Method

In practicing the invention, the following method may be used. To periodically rotate pizza pies in a deck oven for even cooking, the pizza chef holds the pizza peel 10 at the handle proximal end 22 and slides blade 40 underneath a pizza pie resting on a deck oven cooking surface. The user lifts the blade 40 and pie, operates the rotation grip mechanism 60 to rotate the blade 40 and pie a preset number of degrees, preferably a quarter turn, then lowers the blade 40 to rest on the cooking surface and slides the blade 40 from underneath the pie, leaving the pie in a new, rotated position.

The user passes a hand through wrist loop structure 48 and grips the grip bar 70 forward surface with his or her fingers, and wraps the thumb of the same hand around the thumb grip surface 76. Then the user squeezes grip bar 70 rearwardly toward thumb grip surface 76 and thus pulls pull cable 28 rearwardly, thereby rotating cable pulley 32 and blade 40 the pre-selected number of degrees.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A pizza peel, comprising:
   an elongate handle having a handle proximal end and a scooping blade distal end;
   a pie scooping blade rotatably mounted at said scooping blade distal end;
   a blade rotation assembly at said scooping blade distal end;
   and a blade advancement mechanism at said handle proximal end operationally connected to said blade rotation assembly;
   wherein said blade advancement mechanism is a blade rotation grip mechanism;
   wherein said blade rotation grip mechanism is operationally connected to said blade rotation assembly by a blade rotation pull cable having a cable proximal end and a cable distal end.

2. The pizza peel of claim 1, wherein said handle proximal end comprises a wrist encircling wrist loop structure.

3. The pizza peel of claim 1, wherein said blade rotation grip mechanism comprises a grip member for gripping by a user hand, and grip member guide means connected to said handle in which said grip member is slidably mounted, said grip member being connected to said cable proximal end.

4. A pizza peel, comprising:

an elongate handle having a handle proximal end and a scooping blade distal end;

a pie scooping blade rotatably mounted at said scooping blade distal end and having a blade initial rotational position relative to said handle;

a blade rotation assembly at said scooping blade distal end;

and a blade advancement mechanism at said handle proximal end operationally connected to said blade rotation assembly;

wherein said blade advancement mechanism is a blade rotation grip mechanism;

wherein said blade rotation grip mechanism is operationally connected to said blade rotation assembly by a blade rotation pull cable having a cable proximal end and a cable distal end;

wherein said blade rotation assembly comprises:

a blade mounting flange connected to said scooping blade distal end;

a blade axle secured to and protruding from said blade mounting flange, said blade being rotatably mounted on said axle;

a cable pulley fitting around said axle and rotatable relative to said axle and affixed to said blade, said cable pulley having a cable receiving circumferential pulley channel;

and a rotational return spring having a spring inward end secured to said pulley and having a spring outward end secured to said mounting flange;

such that after said blade rotation grip mechanism is operated and causes said pulley and blade to rotate, said rotational return spring rotates said blade back to blade initial rotational position upon release of said rotation grip mechanism.

5. The pizza peel of claim 4, wherein said blade rotation grip mechanism comprises:

a grip panel comprising a grip port opening laterally through said grip panel, said grip port having a port upper wall containing a substantially longitudinal upper grip channel and having a port lower wall containing a substantially longitudinal lower grip channel, said grip panel having a thumb grip surface;

an upright grip bar within said grip port, having an upper grip bar end extending into said upper grip channel and having a lower grip bar end extending into said lower grip channel, such that said grip bar is slidable forwardly and rearwardly within said grip port in the upper and lower grip channels, said cable proximal end being connected to said grip bar and passing longitudinally along said handle to said cable pulley, said cable distal end being secured within said circumferential pulley channel.

6. The pizza peel of claim 5, wherein said grip bar upper and lower ends each comprise a perpendicular slide segment which slides within the corresponding said grip channel, such that said grip bar is constrained to remain within said grip channels.

7. The pizza peel of claim 5, wherein said handle is tubular, having a hollow handle interior, and said pull cable passes within said hollow handle interior.

8. The pizza peel of claim 5, wherein said grip bar comprises at least one finger grip notch.

9. A pizza peel, comprising:

an elongate handle having a handle proximal end and a scooping blade distal end;

a pie scooping blade rotatably mounted at said scooping blade distal end and having a blade initial rotational position relative to said handle;

a blade rotation assembly at said scooping blade distal end;

and a blade advancement mechanism at said handle proximal end operationally connected to said blade rotation assembly;

wherein said blade advancement mechanism is a blade rotation grip mechanism;

wherein said blade rotation grip mechanism is operationally connected to said blade rotation assembly by a blade rotation pull cable having a cable proximal end and a cable distal end;

wherein said blade rotation assembly comprises:

a blade axle secured relative to and protruding from said scooping blade distal end, said blade being rotatably mounted relative to said blade axle;

a cable pulley affixed relative to said blade such that said pulley and said blade are constrained to rotate in unison, said cable pulley having a cable receiving means;

and a rotational return spring having a spring first end secured to one of said cable pulley and said blade and having a spring second end secured to said scooping blade distal end;

such that after said blade rotation grip mechanism is operated and causes said pulley and blade to rotate, said rotational return spring rotates said blade back to the blade initial rotational position upon release of said rotation grip mechanism.

10. The pizza peel of claim 9, wherein said scooping blade distal end comprises a blade mounting flange.

* * * * *